(12) United States Patent
Galizio et al.

(10) Patent No.: US 10,590,267 B2
(45) Date of Patent: *Mar. 17, 2020

(54) METHODS FOR PREPARING TIRE TREADS WITH ADVANTAGEOUS WEAR CHARACTERISTICS

(71) Applicant: Bridgestone Americas Tire Operations, LLC, Nashville, TN (US)

(72) Inventors: Benjamin C. Galizio, Kent, OH (US); Maryangel G. Dunlavy, Ravenna, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/329,288

(22) PCT Filed: Jul. 28, 2015

(86) PCT No.: PCT/US2015/042407
§ 371 (c)(1),
(2) Date: Jan. 26, 2017

(87) PCT Pub. No.: WO2016/032662
PCT Pub. Date: Mar. 3, 2016

(65) Prior Publication Data
US 2017/0247530 A1    Aug. 31, 2017

Related U.S. Application Data

(60) Provisional application No. 62/042,972, filed on Aug. 28, 2014.

(51) Int. Cl.
*B60C 1/00* (2006.01)
*C08J 3/22* (2006.01)
*C08L 9/06* (2006.01)

(52) U.S. Cl.
CPC .............. *C08L 9/06* (2013.01); *B60C 1/0016* (2013.01); *C08J 3/22* (2013.01); *C08J 2309/06* (2013.01); *C08J 2407/00* (2013.01); *C08J 2409/00* (2013.01); *C08L 2205/03* (2013.01); *C08L 2310/00* (2013.01)

(58) Field of Classification Search
CPC ....... B60C 1/0016; C08J 3/22; C08J 2309/06; C08J 2407/00; C08J 240/00; C08L 9/06; C08L 2205/03; C08L 2310/00
See application file for complete search history.

(56) References Cited

U.S. PATENT DOCUMENTS

| | | | |
|---|---|---|---|
| 5,504,137 A | 4/1996 | Sandstrom et al. | |
| 6,220,323 B1 | 4/2001 | Sandstrom et al. | |
| 6,649,684 B1 * | 11/2003 | Okel | B82Y 30/00 106/468 |
| 6,713,549 B1 | 3/2004 | Wideman et al. | |
| 2004/0152811 A1 | 8/2004 | Lin et al. | |
| 2010/0105805 A1 | 4/2010 | Sasaka | |
| 2014/0107285 A1 | 4/2014 | Hirata et al. | |

OTHER PUBLICATIONS

International Search Report for Appl. No. PCT/US2015/042407 dated Oct. 23, 2015, pp. 1-3.

* cited by examiner

*Primary Examiner* — Irina S Zemel
*Assistant Examiner* — Jeffrey S Lenihan
(74) *Attorney, Agent, or Firm* — Meredith E. Hooker; Arthur M. Reginelli

(57) ABSTRACT

A method for preparing a vulcanizable composition of matter, the method comprising mixing rubber, silica, silica coupling agent, a strong base, and nicotinamide to form a masterbatch, introducing a curative to the masterbatch, and mixing the curative into the masterbatch to form a vulcanizable composition of matter.

9 Claims, No Drawings

METHODS FOR PREPARING TIRE TREADS WITH ADVANTAGEOUS WEAR CHARACTERISTICS

FIELD OF THE INVENTION

Embodiments of the present invention are directed toward methods for preparing tire treads with advantageous wear characteristics. According to one or more embodiments of the invention, rubber, silica, and silica coupling agent are mixed in the presence of a strong base and nicotinamide prior to introducing a curative.

BACKGROUND OF THE INVENTION

In the art of making tire components, especially tire treads, silica has been employed as a filler to provide, among other benefits, advantageous wear characteristics. The silica is employed in conjunction with a silica coupling agent that chemically links the silica to the rubber. For example, mercaptosilanes have been employed as coupling agents whereby the mercapto unit reacts with unsaturation within the rubber and the silane unit reacts with the surface of the silica particle through a condensation reaction. The prior art, such as U.S. Publ. No. 2004/0152811, teaches that strong bases, such as diphenyl guanidine, can promote this condensation reaction and lead to improved results. These strong bases, however, also act as accelerators for sulfur curing of the rubber, and therefore the use of these strong bases must be carefully tailored so as not to deleteriously impact cure properties.

SUMMARY OF THE INVENTION

One or more embodiments of the present invention provide a method for preparing a vulcanizable composition of matter, the method comprising mixing rubber, silica, silica coupling agent, a strong base, and nicotinamide to form a masterbatch, introducing a curative to the masterbatch, and mixing the curative into the masterbatch to form a vulcanizable composition of matter.

DETAILED DESCRIPTION OF ILLUSTRATIVE EMBODIMENTS

Introduction

Embodiments of the invention are based, at least in part, on the discovery of a mixing process for the preparation of vulcanizable compositions useful for preparing tire treads. According to these processes, rubber, silica, and silica coupling agent are mixed in the presence of nicotinamide and a strong base prior to introducing a curative such as sulfur. Tire treads produced from these vulcanizable compositions show advantageous wear characteristics. While the prior art proposes use of a strong base during similar mixing techniques, and also proposes the use of nicotinamide as a cure accelerator, the wear characteristics obtained by practice of the present invention were unexpected. Indeed, without wishing to be bound by an particular theory, it is believed that the nicotinamide and the strong base synergistically interact or provide a synergistic impact and thereby yield the advantageous wear characteristics without deleteriously impacting cure properties.

Mixing Procedure

In one or more embodiments, the process of the present invention includes the step of mixing rubber, silica, and silica coupling agent in the presence of a strong base and nicotinamide prior to the introduction of a curative. Following this mixing step, a curative is introduced to the composition and mixing is continued. Other ingredients that are conventional in making vulcanizable compositions for tire treads may also be included. For example, together with the rubber, silica, silica coupling agent, strong base, and nicotinamide, other ingredients such as carbon black, processing oil, processing aids such as zinc oxide and fatty acid, and antidegradents such as antioxidants or antiozonants may also be included. Also, together with the introduction of a curative, various cure accelerators and/or cure retarders may be included.

Masterbatch Mixing Step

The mixing of rubber, silica, and silica coupling agent and other non-curative ingredients (e.g., strong base and nicotinamide) may be referred to as a masterbatch mixing step, and the composition produced by the mixing step may be referred to as a masterbatch. This step may also be referred to as a non-productive mixing step. In one or more embodiments, the rubber, silica, silica coupling agent, strong base, and nicotinamide are generally introduced at the same time and mixed for generally the same amount of time under similar conditions. In other embodiments, two or more of the rubber, silica, silica coupling agent, strong base, and nicotinamide are mixed in a first mixing sub-step, and the remainder of the ingredients are then subsequently added, and mixing is continued. In other words, there may be two or more masterbatch mixing steps. For example, in one or more embodiments, rubber and silica may be initially mixed in a first masterbatch mixing step, and then following this first masterbatch mixing step, coupling agent, nicotinamide, and a strong base may be introduced to the composition and mixing is continued. In other embodiments, rubber silica, silica coupling agent, and nicotinamide are introduced and mixed in a first masterbatch mixing step, and then in a second masterbatch mixing step, a strong base is added and mixed. Alternatively, rubber silica, silica coupling agent and strong base are introduced and mixed in a first masterbatch mixing step, and then in a second masterbatch mixing step, nicotinamide is added and mixed. In one or more embodiments, the composition may be dropped from the mixer and/or cooled between the various masterbatch mixing steps. While these masterbatch mixing steps may be distinguished based upon an intervening cooling step, the two or more masterbatch mixing steps are characterized by a peak temperature (i.e., drop temperature) that is above the mixing temperature employed in the final mixing step. These peak mixing temperatures are described below.

In other exemplary embodiments, fractions of one or more of the ingredients may be added over two or more masterbatch mixing steps. For example, in a first masterbatch mixing step, rubber, silica, coupling agent, and a strong base may be introduced and mixed, and then, in a subsequent masterbatch mixing step, additional silica, coupling agent, and nicotinamide may be subsequently introduced to the composition and mixing is continued in a second masterbatch mixing step. In one or more embodiments, at least one of the strong base and the nicotinamide are added together with or at least within the same sub-step as the coupling agent.

In one or more embodiments, the masterbatch mixing step, or one or more sub-steps of the masterbatch mixing step, may be characterized by the peak temperature obtained by the composition during the mixing. This peak temperature may also be referred to as a drop temperature. In one or more embodiments, the peak temperature of the composition during the masterbatch mixing step may be at least 140° C., in other embodiments at least 150° C., and in other embodiments at least 160° C. In these or other embodiments, the peak temperature of the composition during the masterbatch mixing step may be from about 140 to about 200° C., in other embodiments from about 150 to about 190° C., and in other embodiments from about 160 to about 180° C.

In one or more embodiments, the amount of strong base added as part of the masterbatch mixing step may be described based upon the rubber present within the composition, which rubber is introduced during the masterbatch mixing step including any sub-steps thereof. In one or more embodiments, the amount of strong base introduced as part of the masterbatch mixing step may be at least 0.3, in other embodiments at least 0.5, and in other embodiments 1.0 parts by weight (pbw) strong base per 100 parts by weight rubber (phr). In these or other embodiments, the amount of strong base added as part of the masterbatch mixing step may be at most 2.5, in other embodiments at most 2.0, and in other embodiments at most 1.8 parts by weight (pbw) strong base per 100 parts by weight rubber (phr). In one or more embodiments, the amount of strong base introduced as part of the masterbatch mixing step may be from about 0.3 to about 2.5, in other embodiments from about 0.5 to about 2.0, and in other embodiments from about 1.0 to about 1.8 parts by weight (pbw) strong base per 100 parts by weight rubber (phr).

In one or more embodiments, the amount of nicotinamide added as part of the masterbatch mixing step may be described based upon the rubber present within the composition, which rubber is introduced during the masterbatch mixing step including any sub-steps thereof. In one or more embodiments, the amount of nicotinamide introduced as part of the masterbatch mixing step may be at least 0.5, in other embodiments at least 1.0, and in other embodiments 1.5 parts by weight (pbw) nicotinamide per 100 parts by weight rubber (phr). In these or other embodiments, the amount of nicotinamide added as part of the masterbatch mixing step may be at most 3.3, in other embodiments at most 3.0, and in other embodiments at most 2.8 parts by weight (pbw) nicotinamide per 100 parts by weight rubber (phr). In one or more embodiments, the amount of nicotinamide introduced as part of the masterbatch mixing step may be from about 0.5 to about 3.3, in other embodiments from about 1.0 to about 3.0, and in other embodiments from about 1.5 to about 2.8 parts by weight (pbw) nicotinamide per 100 parts by weight rubber (phr).

In one or more embodiments, at the conclusion of the masterbatch mixing step, the composition is allowed to cool prior to the final mixing step. In practice, this typically includes dropping the composition from the mixer and allowing the composition to cool and then the composition is reintroduced to the mixer for the final mixing step. In one or more embodiments, after the masterbatch mixing step, the composition is allowed to cool to temperatures below 130° C., in other embodiments below 100° C., in other embodiments below 70° C., and in other embodiments below 30° C. In one or more embodiments, the composition is allowed to cool under standard conditions of temperature and pressure for at least 1 hour, in other embodiments at least 6 hours, and in other embodiments at least 12 hours.

Final Mixing Step

Following masterbatch mixing, a curative or curative system is introduced to the composition and mixing is continued to ultimately form the vulcanizable composition of matter. This mixing step may be referred to as the final mixing step, the curative mixing step, or the productive mixing step.

In one or more embodiments, the final mixing step may be characterized by the peak temperature obtained by the composition during final mixing. As the skilled person will recognize, this temperature may also be referred to as the final drop temperature. In one or more embodiments, the peak temperature of the composition during final mixing may be at most 130, in other embodiments at most 110, and in other embodiments at most 100° C. In these or other embodiments, the peak temperature of the composition during final mixing may be from about 80 to about 130° C., in other embodiments from about 90 to about 115° C., and in other embodiments from about 95 to about 105° C.

Ingredients

Rubber

In one or more embodiments, the rubber, which may also be referred to as a vulcanizable rubber or elastomer, may include those polymers that can be vulcanized to form compositions possessing rubbery or elastomeric properties. These elastomers may include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more $\alpha$-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

Silica

Silica useful as filler within the vulcanizable compositions of the invention are generally well-known. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

In one or more embodiments, the pH of silica may be from about 5 to about 7 or slightly over 7, or in other embodiments from about 5.5 to about 6.8.

Silica Coupling Agent

In one or more embodiments, the silica coupling agent is a sulfur-containing silica coupling agent. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano) tetrasulfides.

Exemplary bis(trialkoxysilylorgano)disulfide silica coupling agents suitable for use in the invention include, but are not limited to, 3,3'-bis(triethoxy-silyl-propyl)disulfide, 3,3'-bis(trimethoxysilyl-propyl)disulfide, 3,3'-bis(tributoxysilyl-propyl)disulfide, 3,3'-bis(tri-m-butoxysilylpropyl)disulfide, 3,3'-bis(trihexoxysilyl-propyl)disulfide, 2,2'-bis(dimethylmethoxysilylethyl)disulfide, 3,3'-bis(diphenyl-cyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and the like, and mixtures of any of the foregoing.

Exemplary bis(trialkoxysilylorgano)tetrasulfide silica coupling agents suitable for use in the invention include, but are not limited to, bis(3-triethoxysilylpropyl)tetrasulfide, bis(2-triethoxysilylethyl)tetrasulfide, bis(3-trimethoxysilylpropyl)tetrasulfide, 3-trimethoxysilylpropyl-N,N-dimethylthio-carbamoyl tetrasulfide, 3-triethoxysilylpropyl-N,N-dimethylthiocarbamoyl tetra-sulfide, 2-triethoxysilyl-N,N-dimethylthiocarbamoyl tetrasulfide, 3-trimethoxy-silylpropylbenzothiazole tetrasulfide, 3-triethoxysilylpropylbenzothiazole tetrasulfide, and the like, and mixtures of any of the foregoing. Particularly preferred is bis(3-triethoxysilylpropyl)tetrasulfide.

Chemically-Treated Inorganic Oxide

In one or more embodiments, a chemically-treated inorganic oxide may be used in addition to or in lieu of silica and/or coupling agent. In one or more embodiments, the chemically-treated inorganic oxide employed in the practice of the present invention is known as described in U.S. Pat. Nos. 6,342,560, 6,649,684, 7,569,107, 7,687,107, and 7,704,552, which are incorporated herein by reference. Also, chemically-treated inorganic oxides are commercially available under the tradenames Agilon™ 454 silica, Agilon™ 400 silica, Agilon™ and 458 Silica (PPG Industries).

In one or more embodiments, the chemically-treated inorganic oxide, which may include an amorphous or particulate inorganic oxide, may be characterized by a carbon content of greater than 1 weight percent, a sulfur content of greater than 0.1 weight percent, a Silane Conversion Index (described hereinafter) of at least 0.3 and a Standard Tensile Stress @ 300% elongation (also described hereinafter) of 7 or more can be prepared. The process described in U.S. Pat. No. 5,908,660, which is incorporated herein, may be improved and used to produce the modified filler of the present invention by utilizing a certain combination of functionalizing and hydrophobizing agents in an aqueous suspension of inorganic oxide having a pH of 2.5 or less and treating the acidic aqueous suspension of modified fillers with acid neutralizing agents to increase the pH of the suspension to a range of from 3.0 to 10.

Strong Base

In one or more embodiments, strong bases suitable for use in the invention have a $pK_a$ of greater than about 10, in other embodiments about 11 to about 18 and, and in other embodiments greater than about 12. Exemplary strong organic bases include, but are not limited to, strong alkali metal alkoxides, such as sodium or potassium alkoxide; guanidines, such as triphenylguanidine (TPG), diphenylguanidine (DPG), di-o-tolylguanidine (DTG), N,N,N',N'-tetramethylguanidine (TMG), and the like; and hindered amine bases, such as 1,8-diazabicyclo[5.4.0]undec-7-ene (DBU), 1,5-diazabicyclo[4.3.0]non-5-ene (DBN), and the like, tertiary amine catalysts, such as N,N-dimethylcyclohexylamine, triethylenediamine, triethylamine, and the like, quaternary ammonium bases, such as tetrabutylammonium hydroxide, bisaminoethers, such as bis(dimethylaminoethyl)ethers, and the like.

Nicotinamide

Nicotinamide is a well-known compound and may also be referred to as nicocynamide or niacynamide, nicotinicamide, or pyridine-3-carboxamide. Nicotinamide is identified by CAS No. 98-92-0.

Curatives

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, the curative is sulfur. Examples of suitable sulfur vulcanizing agents include "rubberrmaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination. The skilled person will be able to readily select the amount of vulcanizing agents to achieve the level of desired cure.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like. The skilled person will be able to readily select the amount of cure accelerators to achieve the level of desired cure.

Carbon Black

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

Silica Dispersing Agent

Exemplary silica dispersing aids suitable for use in the invention include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof, or a mineral or non-mineral additional filler.

Other Ingredients

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

In one or more embodiments, the vulcanizable composition, which is the composition resulting from the foregoing mixing steps, may be described with reference to the amounts of the various constituents within the composition. These amounts, which are described herein below, are provided irrespective of the particular step where the ingredient may be introduced.

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Silica

In one or more embodiments, the vulcanizable compositions include at least 5, in other embodiments at least 25, and in other embodiments at least 50 parts by weight (pbw) silica per 100 parts by weight rubber (phr). In these or other embodiments, the vulcanizable composition includes at most 200, in other embodiments at most 130, and in other embodiments at most 80 pbw of the silica phr. In one or more embodiments, the vulcanizable composition includes from about 5 to about 200, in other embodiments from about 25 to about 130, and in other embodiments from about 50 to about 80 pbw of silica phr.

Silica Coupling Agent

In one or more embodiments, the vulcanizable compositions include at least 1, in other embodiments at least 2, and in other embodiments at least 5 parts by weight (pbw) silica coupling agent per 100 parts by weight silica. In these or other embodiments, the vulcanizable composition includes at most 20, in other embodiments at most 15, and in other embodiments at most 10 pbw of the silica coupling agent per 100 parts by weight silica. In one or more embodiments, the vulcanizable composition includes from about 1 to about 20, in other embodiments from about 2 to about 15, and in other embodiments from about 5 to about 10 pbw of silica coupling agent per 100 parts by weight silica.

Strong Base

As suggested above, a strong base is added in the masterbatch mixing step. Additional strong base may optionally be added during the final mixing step. Therefore, the amounts provided herein, which are representative of the final vulcanizable composition, includes the amount added within the masterbatch mixing step plus any additional amount added in the final mixing step. In one or more embodiments, the vulcanizable compositions include at least 0.3, in other embodiments at least 0.5, and in other embodiments at least 1.0 parts by weight (pbw) strong base per 100 parts by weight rubber (phr). In these or other embodiments, the vulcanizable composition includes at most 2.5, in other embodiments at most 2.0, and in other embodiments at most 1.8 pbw of the strong base phr. In one or more embodiments, the vulcanizable composition includes from about 0.3 to about 2.5, in other embodiments from about 0.5 to about 2.0, and in other embodiments from about 1.0 to about 1.8 pbw of strong base phr.

Nicotinamide

As suggested above, a nicotinamide is added in the masterbatch mixing step. Additional nicotinamide may optionally be added during the final mixing step. Therefore, the amounts provided herein, which are representative of the final vulcanizable composition, includes the amount added within the masterbatch mixing step plus any additional amount added in the final mixing step. In one or more embodiments, the vulcanizable compositions include at least 0.5, in other embodiments at least 1.0, and in other embodiments at least 1.5 parts by weight (pbw) nicotinamide per 100 parts by weight rubber (phr). In these or other embodiments, the vulcanizable composition includes at most 3.3, in other embodiments at most 3.0, and in other embodiments at most 2.8 pbw of the nicotinamide phr. In one or more embodiments, the vulcanizable composition includes from about 0.5 to about 3.3, in other embodiments from about 1.0 to about 3.0, and in other embodiments from about 1.5 to about 2.8 pbw of nicotinamide phr.

Carbon Black

In one or more embodiments, the vulcanizable compositions include at least 0, in other embodiments at least 10, and in other embodiments at least 20 parts by weight (pbw) of the first carbon black per 100 parts by weight rubber (phr). In these or other embodiments, the vulcanizable composition includes at most 200, in other embodiments at most 100, and in other embodiments at most 70 pbw of the first carbon black phr. In one or more embodiments, the vulcanizable composition includes from about 0 to about 200, in other embodiments from about 10 to about 100, and in other embodiments from about 20 to about 70 pbw of the first carbon black phr.

Silica Dispersing Agent

In one or more embodiments, the vulcanizable compositions include at least 0, in other embodiments at least 5, and in other embodiments at least 7 parts by weight (pbw) silica dispersing agent per 100 parts by weight silica. In these or other embodiments, the vulcanizable composition includes at most 20, in other embodiments at most 16, and in other embodiments at most 12 pbw of the silica dispersing agent per 100 parts by weight silica. In one or more embodiments, the vulcanizable composition includes from about 0 to about 20, in other embodiments from about 5 to about 16, and in other embodiments from about 7 to about 12 pbw of silica dispersing agent per 100 parts by weight silica.

Mixing Equipment

All ingredients of the rubber compositions can be mixed with standard mixing equipment such as Banbury or Brabender mixers, extruders, kneaders, and two-rolled mills. As suggested above, the ingredients are mixed in two or more stages. In the first stage (i.e., mixing stage), which typically includes the rubber component and filler, is prepared.

Preparation of Tire

The compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

In order to demonstrate the practice of the present invention, several vulcanizable compositions were prepared by using the ingredients and mixing order provided in Table I below. As shown in Table I, the vulcanizable compositions were prepared by using two masterbatch mixing steps. A cure system was then added and mixed in a final mixing step. Generally speaking, the amount and location of nicotinamide and diphenyl guanidine addition and mixing were varied. Table I also provides the results of some analytical testing that was performed on the compositions and/or vulcanizates prepared therefrom.

TABLE I

| Ingredients | Samples | | | | | | |
|---|---|---|---|---|---|---|---|
| | 1 | 2 | 3 | 4 | 5 | 6 | 7 |
| First Masterbatch | | | | | | | |
| Natural Rubber | 10 | 10 | 10 | 10 | 10 | 10 | 10 |
| High cis Polybutadiene | 40 | 40 | 40 | 40 | 40 | 40 | 40 |
| Styrene-butadiene Rubber | 68.75 | 68.75 | 68.75 | 68.75 | 68.75 | 68.75 | 68.75 |
| Reinforcing Carbon Black | 15 | 15 | 15 | 15 | 15 | 15 | 15 |
| Silica | 45 | 45 | 45 | 45 | 45 | 45 | 45 |
| Silica Coupling Agent | 3.96 | 3.96 | 3.96 | 3.96 | 3.96 | 3.96 | 3.96 |
| ROcessing Oil | 10 | 10 | 10 | 10 | 10 | 10 | 10 |
| Paraffinic Wax | 3 | 3 | 3 | 3 | 3 | 3 | 3 |
| Processing Additive | 1.5 | 1.5 | 1.5 | 1.5 | 1.5 | 1.5 | 1.5 |
| Diphenyl Guanadine | 0 | 1 | 0 | 0 | 0 | 1 | 0 |
| Nicotinamide | 0 | 0 | 0 | 1 | 0 | 0 | 1 |
| Second Masterbatch | | | | | | | |
| Silica | 15 | 15 | 15 | 15 | 15 | 15 | 15 |
| Silica Coupling Agent | 1.32 | 1.32 | 1.32 | 1.32 | 1.32 | 1.32 | 1.32 |
| Processing Oil | 3 | 3 | 3 | 3 | 3 | 3 | 3 |
| Antioxidant | 1.18 | 1.18 | 1.18 | 1.18 | 1.18 | 1.18 | 1.18 |
| Processing Additive | 2.0 | 2.0 | 2.0 | 2.0 | 2.0 | 2.0 | 2.0 |
| Stearic Acid | 2 | 2 | 0 | 2 | 0 | 0 | 0 |
| Nicotinamide | 0 | 0 | 0 | 0 | 1 | 1 | 0 |
| Diphenyl Guanidine | 0 | 0 | 1 | 0 | 0 | 0 | 1 |
| Final Mix | | | | | | | |
| Sulfur | 1.85 | 1.85 | 1.85 | 1.85 | 1.85 | 1.85 | 1.85 |
| Accelerator | 0.7 | 0.7 | 0.7 | 0.7 | 0.7 | 0.7 | 0.7 |
| Accelerator | 0.7 | 0.7 | 0.7 | 0.7 | 0.7 | 0.7 | 0.7 |
| Zinc Oxide | 2.5 | 2.5 | 2.5 | 2.5 | 2.5 | 2.5 | 2.5 |
| Diphenyl Guanidine | 1.25 | 0.25 | 0.25 | 1 | 1 | 0 | 0 |
| Stearic Acid | 0 | 0 | 2 | 0 | 2 | 2 | 2 |
| Analytical Properties | | | | | | | |
| Rheometer MDR | | | | | | | |
| t-50 (min) | 4.85 | 5.28 | 5.09 | 4.92 | 4.93 | 5.07 | 5.03 |
| t-90 (min) | 9.36 | 10.04 | 9.89 | 9.43 | 9.55 | 9.48 | 9.51 |
| RPA (Time_ 2 dNm | | | | | | | |
| G' @ 1 min | 49.24 | 50.52 | 50.61 | 46.96 | 50.65 | 50.56 | 48.04 |
| Scorch _SP | 19.93 | 22.27 | 21.26 | 20.02 | 20.27 | 21.09 | 20.79 |
| Lambourne-Type Wear Test | 100 | 104 | 109 | 109 | 111 | 118 | 115 |

The various mixing steps were performed within a Banbury mixer. During preparation of the first masterbatch, the mixer was operated at 75 rpm and the peak temperature attained by the composition was 160° C. At that point in time, the composition was dropped from the mixer. Upon cooling to a temperature below about 85° C., the composition was then reintroduced to the mixer along with the various other ingredients identified for the second masterbatch. Mixing was continued at 75 rpm, and a peak composition temperature of about 160° C. was attained. The composition was again dropped from the mixer and allowed to cool below a temperature of about 85° C. At this point in time, the composition was then reintroduced to the mixer along with the ingredients identified for the final mix stage. Mixing was continued at 40 rpm at a peak compositional temperature of about 100° C. The composition was then dropped from the mixer and samples were obtained from the composition for purposes of the analytical testing.

Rheometer measurements were taken using an MDR 200 operating at 160° C. RPA measurements were taken using an Alpha Technologies instrument operating at 266° F. Wear was quantified by using tests similar to the Lambourne wear tests, which are described in U.S. Pat. Nos. 7,750,087 and 6,939,910, which are incorporated herein by reference. The results the tests were indexed to the control, which was Sample 1.

Various modifications and alterations that do not depart from the scope and spirit of this invention will become apparent to those skilled in the art. This invention is not to be duly limited to the illustrative embodiments set forth herein.

What is claimed is:

1. A method for preparing a vulcanizable composition of matter, the method comprising:
   i. preparing and mixing a rubber-containing composition to a peak composition temperature of at least 150° C. to thereby form a first masterbatch composition, where the rubber-containing composition includes (a) a rubber component including poly(styrene-co-butadiene) and at least one rubber selected from the group consisting of natural rubbers, synthetic polyisoprene, polybutadiene, and mixtures thereof, (b) from about 25 to about 130 phr of silica, (c) from about 2 to about 15 phr of silica coupling agent, (d) optionally from about 10 to about 100 phr of carbon black, and (e) one of (e-1) from about 0.5 to about 2.0 phr of a strong base and (e-2) and from about 1.0 to about 3.0 phr of nicotinamide;
   ii. adding to the first masterbatch composition (a) from about 5 to about 80 phr silica; (b) from about 1 to about 10 phr silica coupling agent; and (c) the other of (e-1) or (e-2) that was not included in the first masterbatch, and mixing to a peak composition temperature of at least 150° C. to thereby form a second masterbatch composition; and
   iii. introducing a sulfur-based curative to the second masterbatch composition, and mixing to a peak composition temperature of at most 130° C. to thereby form a vulcanizable composition of matter.

2. The method of claim 1, further comprising the step of forming the vulcanizable composition into a green tire tread, and curing the green tire tread into a cured tread.

3. The method of claim 1, where the strong base is a guanidine.

4. The method of claim 1, where the strong base is diphenyl guanidine.

5. The method of claim 4, where the rubber-containing composition includes a processing oil.

6. The method of claim 5, where the rubber-containing composition includes a wax.

7. The method of claim 6, where stearic acid is added to the first masterbatch.

8. The method of claim 1, where the rubber-containing composition includes a chemically-treated inorganic oxide.

9. A method for preparing a tire tread, the method comprising:
   i. preparing and mixing a rubber-containing composition to a peak composition temperature of at least 150° C. to thereby form a first masterbatch composition, where the rubber-containing composition includes (a) a rubber component including poly(styrene-co-butadiene) and at least one rubber selected from the group consisting of natural rubbers, synthetic polyisoprene, polybutadiene, and mixtures thereof, (b) from about 25 to about 130 phr of silica, (c) from about 2 to about 15 phr of silica coupling agent, (d) optionally from about 10 to about 100 phr of carbon black, and (e) one of (e-1) from about 0.5 to about 2.0 phr of a strong base and (e-2) and from about 1.0 to about 3.0 phr of nicotinamide;
   ii. adding to the first masterbatch composition (a) from about 5 to about 80 phr silica; (b) from about 1 to about 10 phr silica coupling agent; and (c) the other of (e-1) or (e-2) that was not included in the first masterbatch, and mixing to a peak composition temperature of at least 150° C. to thereby form a second masterbatch composition;
   iii. introducing a sulfur-based curative to the second masterbatch composition, and mixing to a peak composition temperature of at most 130° C. to thereby form a vulcanizable composition of matter;
   iv. forming the vulcanizable composition into a green tire tread; and
   v. curing the green tire tread into a cured tread.

* * * * *